United States Patent Office 2,996,459
Patented Aug. 15, 1961

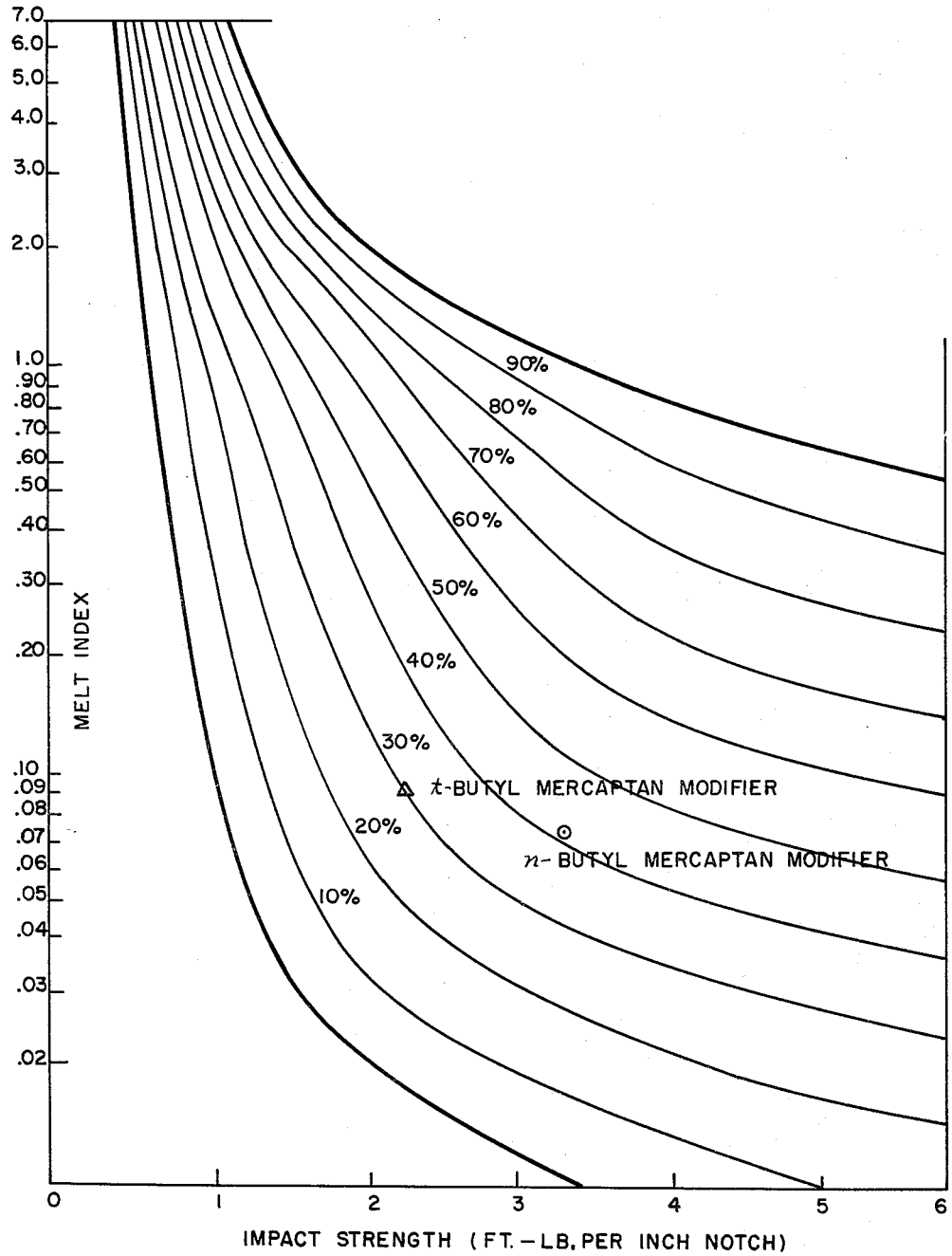

2,996,459
METHOD FOR PREPARING A ZIEGLER POLYMERIZATION CATALYST
Harry M. Andersen and William R. Richard, Jr., Dayton, Ohio, assignors to Monsanto Chemical Company, St. Louis, Mo., a corporation of Delaware
Filed Feb. 3, 1958, Ser. No. 712,864
5 Claims. (Cl. 252—429)

This invention relates to Ziegler catalysts, to the preparation of Ziegler catalysts, and to the use of Ziegler catalysts to effect chemical reactions, especially polymerizations. In certain preferred aspects, the invention pertains to the production of high-density polyethylene by polymerizing ethylene in the presence of a catalyst exemplified by the material obtained by the interaction of a trialkyl aluminum with titanium tetrachloride, said catalyst having been especially treated to result in the production of polyethylene of improved properties over that obtainable with the same catalyst not so treated.

SUMMARY OF INVENTION

The essence of the present invention lies in the use of a mercaptan to modify the characteristics of Ziegler catalysts, whereby the use of such modified catalysts permits the production of improved Ziegler polymers. In a fundamental aspect, the invention involves the use of a mercaptan-modified Ziegler catalyst to narrow the molecular weight distribution pattern of Ziegler polymers, with consequent improvement in many properties. Of especial interest is the production of polyethylene of high density and improved impact/flow properties made possible by the practice of the invention.

SIGNIFICANCE OF POLYMER DENSITY

In any polymer showing the presence of a crystalline phase by X-ray diffraction, the density is a direct function of the crystallinity, the greater the crystallinity the higher the density. High-molecular-weight polymers of ethylene, called polyethylene, are important materials of commerce, and they are partially crystalline semi-rigid polymers having great utility. By the use of certain types of catalysts advanced by Professor-Dr. Karl Ziegler, polyethylene can be made at low pressures and such polyethylene has considerably higher density—generally about 0.940 to 0.948 g. per cc., the density depending somewhat upon reaction conditions and especially on solvent, e.g., in kerosene the usual density is within the range of 0.942 to 0.947 and with heptane the usual density is about 0.948—than polyethylene as usually made by the earlier high-pressure oxygen- or peroxide-catalyzed polymerization methods. These higher density polyethylenes, as a result of their greater crystallinity, are much more rigid than the high-pressure polyethylenes, and have considerably higher softening and melting points. These properties make possible the improvements in the heretofore known uses of polyethylene, and indicate the likelihood that the high-density polyethylenes may replace certain other thermoplastic polymers in various uses. It thus becomes clear that still further increase in crystallinity of polyethylene, which is reflected in increased density, would result in still further improvements in certain properties such as stiffness and resistance to heat. Also, increased crystallinity in polyethylene is reflected in an increased tensile yield strength which, of course, is quite desirable.

SIGNIFICANCE OF FLOW/IMPACT PROPERTIES

Although Ziegler polymers have many valuable properties, Ziegler polymers, particularly Ziegler polyethylenes, have in the past been characterized by a poor relationship of impact and flow properties. The significance of these properties and the importance of their relationship is readily apparent. The impact strength is a measure of the resistance of the material to breaking; it is obvious that high impact strength is desirable for many uses. The melt flow properties of the material indicate the ease with which the material can be induced to flow under pressure; the melt flow properties determine the ease with which the polymer can be processed by such procedures as extrusion, film blowing, etc., the more readily flowing polymers (having higher melt indices) being more readily processed in general. The present commercial Ziegler polyethylene polymers are defective in either impact strength, flow properties, or both, for many applications. Moreover, if the polymerization is adjusted by conventional means to raise the molecular weight thereby improving the impact strength, the flow properties will be adversely affected and the polymer may be completely intractable under ordinary processing conditions. Conversely, if the polymerization conditions are altered in known manner to produce a lower-molecular-weight polymer, the impact strength will be adversely affected and it will be impossible to employ the polymer in applications requiring high impact strength. It will be realized that the impact/flow properties are related to the density of the polymer. For impact properties are ordinarily expected to deteriorate with increasing density, if a constant melt index is maintained.

The present invention makes it possible to prepare polyethylenes and other polymers having both high impact strength and good flow properties. It is not possible to set any absolute limit on the desirable impact strengths and flow properties, as the requirements in this regard will depend on the application. However, it can in general be stated that in the ranges of interest for practical purposes the higher the impact strength and melt index, the better. With reference to the accompanying figure, it will be desirable that the melt indices and impact strengths of the polyethylene be substantially, e.g., 5 to 10% or more, to the right of or above the curve for normal Ziegler polyethylene. In the figure, which illustrates impact strengths and melt indices for low pressure, high-density polyethylenes, values for the melt index are shown on a logarithmic scale on the ordinate, and values for the impact strength are shown on the abscissa. The lower curve represents the impact/flow relationship of normal Ziegler polyethylene, while the upper curve represents the same relationship for the "center-cut" fractions from normal Ziegler polyethylene; the intermediate curves represent the impact/flow relationships of modified Ziegler polyethylenes showing various percentages of improvement in impact/flow relationship as compared to normal Ziegler polyethylene—with the impact/flow relationship of the "center-cut" fractions considered as 100% improvement. The points on the graph represent the polymers produced with the particular modified catalysts of the examples herein under the disclosed conditions.

It is not possible to define precisely the improved impact/flow relationships products according to the present invention by means of simple numerical ranges; however, the invention will generally be employed to produce polyethylene of melt index of at least 0.05 decigram together with impact strength of at least 1.5 ft.-lbs.

It is believed, as will be discussed more fully below, that the improvement in flow/impact properties resulting from the use of the modified polymerization catalysts of the present invention is due to narrower molecular weight distributions in the polymers.

Various other polymers, especially those of unsaturated hydrocarbons such as propylene, butenes, styrene, and the like, can be prepared in crystalline form. It has been said that crystallinity of such polymers can result from an "isotactic" structure of the molecule, which word is used to indicate a regular arrangement of side groups along the carbon chain for at least considerable portions of the molecule. Many of the crystalline polymers of these unsaturated hydrocarbon monomers are obtained by fractionation of total polymer such as by use of one or more solvents which dissolve the amorphous or lesser crystalline portion of the polymer; thus the heptane-insoluble polypropylene and polystyrene are more crystalline than those fractions soluble in heptane. In these polymers other than polyethylene, though crystallinity may primarily result from a regular arrangement of side groups on the chain, it also, no doubt, is somewhat dependent on the extent of branching of the chains, just as in polyethylene. Thus, increased linearity of polymer chain, whether it be polyethylene, polypropylene, polystyrene or the like, as reflected by a lessening of the branching of the chain, results in a higher degree of crystallinity with resulting improved properties as mentioned heretofore.

It can also be appreciated that the flow/impact properties of these other polymers, e.g., those of unsaturated hydrocarbons such as propylene, butenes, styrene, and the like, and copolymers of the foregoing with each other or with ethylene will benefit from a narrower molecular weight distribution resulting from use of the modified catalysts of the present invention.

While the present invention is of especial interest at the present time with respect to polyethylene in which crystallinity is almost solely a reflection of the degree and type of branching, it is also applicable to all Ziegler polymers, special reference being made to polypropylene, polybutene, and polystyrene which are currently of the most potential interest from a commercial viewpoint.

ZIEGLER-TYPE CATALYSTS

There has recently come into commercial prominence the polymerization of ethylene and other monomers through the agency of a type of catalyst advanced by Prof.-Dr. Karl Ziegler of the Max Planck Institute at Mulheim, Ruhr, Germany. Probably the preferred group of these catalysts is that disclosed in Belgian Patent No. 533,362, issued May 16, 1955, to Ziegler, the disclosure of which is hereby incorporated herein by reference, namely catalysts prepared by the interaction of a trialkyl-aluminum with a compound of a metal group IV-B, V-B, or VI-B of the periodic system, including thorium and uranium, and especially compounds of titanium, zirconium, and chromium. These and the variety of other catalysts of the Ziegler type, can be considered exemplified by the catalysts obtained by the interaction of a trialkylaluminum with titanium tetrachloride. Other catalysts of the Ziegler type differ from those disclosed in the above-mentioned Belgian Patent No. 533,362, in various ways, for example, as follows: Instead of or in addition to the aluminum trialkyls, catalysts of the type described in the Belgian patent can be made by reacting the various metal compounds of groups IV-B, V-B, and VI-B disclosed therein with aluminum compounds of the general formula $RAlX_2$, where R is hydrogen or hydrocarbon, X means any other substituent including hydrogen or hydrocarbon, particularly dialkyl or diaryl aluminum monohalides, also aluminum hydride, alkyl or aryl aluminum dihydrides, dialkyl or diaryl aluminum hydrides, alkyl or aryl aluminum dihalides, alkyl or aryl aluminum dialkoxy or diaryloxy compounds, dialkyl or diaryl aluminum alkoxy or aryloxy compounds. Similarly, instead of or in addition to the organoaluminum compounds, organic compounds of magnesium or zinc can be used, and these can contain either a single or two hydrocarbon radicals, those of especial interest being Grignard compounds, magnesium dialkyls, mixed organo zinc compounds such as $C_2H_5ZnI$ and zinc dialkyls, all of these, of course, being reacted with compounds of groups IV-B, V-B or VI-B metals. Another Ziegler type catalyst is prepared by the interaction of an aluminum compound of the general formula $R_2AlX$ where R is a hydrocarbon radical such as alkyl or aryl, and X is a halogen, such as chlorine or bromine, with a compound of a metal of group VIII of the periodic system, e.g., iron, nickel, cobalt, or plantium, or manganese, for example, dimethylaluminum monobromide plus ferric chloride, diisobutyl-aluminum chloride plus nickel (trivalent) chloride, diethyl-aluminum monochloride plus manganic chloride. Yet another combination is that of the group IV-B, V-B, or VI-B metal compounds with aluminum compounds of the general formula $R_2AlX$, where R is hydrogen or a hydrocarbon radical, and X is the radical of a secondary amine, a secondary acid amide, etc. Another of the classes of Ziegler type polymerization catalysts comprises compounds of the group IV-B, V-B, and VI-B heavy metals as previously mentioned, combined with the alkali metals alkyls, for example, with lithium-, sodium-, or potassium methyl, -ethyl, -benzyl, -isobutyl, or with complex compounds of such alkali metal alkyls with organic compounds of aluminum, magnesium, or zinc as mentioned above, or complex compounds of alkali metal hydrides with such organic compounds of aluminum, magnesium, or zinc, for example, butyl lithium plus zirconium tetrachloride, sodium tetramethylaluminum plus titanium tetrachloride or plus thorium acetylacetonate. Other Ziegler type catalysts are prepared by using (in conjunction with compounds of group IV-B, V-B, and VI-B metals), instead of trialkylaluminums, triaryl-, triaralkyl-, trialkaryl- or mixed alkyl- and aryl-aluminum, zinc, magnesium or alkali metals, e.g., phenyl sodium plus $TiCl_4$.

Those skilled in the art having knowledge of these matters, refer to catalysts of the foregoing type as Ziegler or Ziegler-type catalysts, and to polymers prepared by their action as Ziegler or Ziegler-type polymers, the terms "Ziegler" and "Ziegler-type" being used synonymously. While the principal classes of such catalysts have been listed, this listing is not to be construed as complete, and various other such catalysts than those set forth may also be used to produce polymers. Thus, ethylene and other monomers can be polymerized by catalysts obtained by treating compounds of heavy metals, especially compounds of the group IV-B, V-B, and VI-B metals, not with organo-metallic compounds but rather by reducing agents such as: alkali metals, e.g., lithium, sodium, potassium; alkali hydrides, e.g., lithium hydride, sodium hydride; complex alkali aluminum and alkali boron hydrides, e.g., lithium aluminum hydride; complexes of alkali metal hydrides with boron triaryls or boric acid esters or boronic acid esters; and especially titanium and zirconium halides reduced by zinc or alkaline earth metals or other earth metals including the rare earths, or hydrides of same; said reductions being effected in the complete absence of oxygen, moisture and compounds containing active hydrogen atoms as determined by the Zerewitinoff method. Attention is further directed to the teaching of various of the foregoing catalysts in Ziegler's Belgian Patents 534,792 and 534,888, the disclosures of which are hereby incorporated herein by reference. Still another disclosure incorporated herein by reference is that of Belgian Patent 538,782, issued jointly to Montecatini Societa Generale per l'Industria Mineraria e Chimica Anonima and Prof.-Dr. Karl Ziegler, disclosing the polymerization of olefins having at least 3 carbon atoms in the molecule, and their copolymerization with each other and with ethylene, using a variety of Ziegler catalysts; olefins, especially α-olefins, disclosed in said Belgian Patent 538,782, include propylene, butylene, isobutylene, pentylene, hexylene, vinyl cyclohexene and styrene. Substantially the same disclosure is found in Australian patent application 9,651/55 also filed by Montecatini and Ziegler jointly. Catalysts of the said Belgian Patent 538,782 and Australian application 9,651/55 are obtained by reaction of compounds of metals of the left-hand column of the 4th to 6th groups of the periodic table of elements, including the thorium and uranium groups, with metals, alloys, metal hydrides, or metal-organic compounds of metals of the 1st to 3rd groups of the periodic table. Yet another disclosure incorporated herein by reference is that of Ziegler's Australian patent application 13,453/55, opened to public inspection May 10, 1956, directed to polymerizing ethylene with catalysts comprising mixtures of organic compounds of the metals of groups I to III of the periodic system of the general formula $R_nMeX$, wherein R represents a hydrocarbon radical; X, a hydrocarbon radical or halogen; and Me, a metal of groups I to III of the periodic system; and $n$, an integer which is less by one than the valency of the metal Me, with compounds of the metals of group VIII of the periodic system or manganese.

Another group of valuable Ziegler catalysts can be defined as mixtures of organic compounds of metals selected from the group consisting of $R_nMeX$ in which R is hydrocarbon; Me is a 1st to 3rd group metal; X is hydrogen, hydrocarbon or halogen; and $n$ is a number which is lower by 1 than the valence of the metal Me, with a salt of a group IV–B to VI–B metal. The molar proportion of the organic metal compound is ordinarily sufficient to reduce the valence of the group IV–B to VI–B metal at least in part.

Ziegler catalysts can also be defined as including all polyvalent metal compounds in combination with reducing agents, particularly organometals, which are effective to reduce the valence of the polyvalent metal; or as compositions containing polyvalent metals in a valence state lower than their maximum state and adapted for the low-pressure polymerization of ethylene so that when suspended in a concentration of about 20 mmoles/liter (based on polyvalent metal) in a well-agitated inert solvent, it will cause an ethylene uptake rate of at least 5 grams per hour per liter of solvent.

It will be seen from the foregoing that a large variety of co-reactants can be employed which by interaction wtih each other result in the formation of a Ziegler catalyst. It is generally considered that the Ziegler catalysts are obtained by interaction of a polyvalent metal compound with another metal in elemental or combined form resulting in reduction of the valence state of the first said metal. The resulting polymetal Ziegler catalyst is believed to act as a heterogeneous catalyst, i.e., at least some of the product obtained by the interaction of the materials in question is present in solid form although often in such finely divided form as to be of colloidal or subcolloidal particle size. The Ziegler catalyst can be employed in the absence of any extraneous liquid suspending agent, such as a liquid inert hydrocarbon, e.g., kerosene, but is more often employed in the form of a colloidal solution or suspension in such a liquid.

The essence of the present invention, however, is not to be found in the particular Ziegler-type catalyst employed but rather in the use of a mercaptan in the preparation of such catalyst, with consequent advantages when used to catalyze a variety of chemical reactions, polymerization of ethylenically unsaturated monomers being of particular interest.

ZIEGLER REACTIONS AND POLYMERS

Ziegler catalysts can be employed to catalyze a variety of chemical reactions, for example, the chlorination of benzene to produce mono- and polychlorobenzenes, especially ortho- and para- to dichlorobenzene. The reaction of most intense commercial interest at the present time is polymerization. The present invention is broadly applicable to all Ziegler catalysts, and their use in all chemical reactions catalyzed thereby, and insofar as polymerization is concerned, is broadly applicable to all Ziegler- type polymers, i.e., all polymers prepared by polymerizing a monomer or mixture of monomers in the presence of a Ziegler-type catalyst. A monomer which can be so polymerized can properly be called a Ziegler-polymerizable monomer. Of especial interest, of course, are those Ziegler solid polymers of sufficiently high molecular weight to be useful in the plastics industry, but benefits of the invention are obtainable in preparing lower-molecular-weight Ziegler semi-solid and even liquid polymers which can be used, for example, in adhesives, as lube oil additives, etc. Preferred polymers have a molecular weight of at least 2,000 and preferably 10,000. Those Ziegler polymers to which the preparation of the present invention is applied with particular advantage generally have much higher molecular weights ranging from 20,000 to 50,000 or 100,000 and even in many cases as high as 1,000,000 to 3,000,000 or more. The molecular weights in question are those calculated in the polymer in solution as described in the Journal für Praktische Chemie, 2nd series, vol. 158, page 136 (1941), and Journal of the American Chemical Society, 73 p. 1901 (1951).

At the present time, ethylene is the preferred monomer for preparing Ziegler polymers, although propylene is also of great interest. The ethylene can be homopolymerized, or can be copolymerized with varying amounts, particularly on the order of from 2 to 10 percent, of higher olefins such as propylene, or butylene, especially the former. The ethylene can also be copolymerized with butadiene and/or isoprene as disclosed in the copending application of Carroll A. Hochwalt, Serial No. 502,008, filed April 18, 1955. Also of interest are the copolymers of butadiene and/or isoprene with styrene, disclosed in the copending application of Carroll A. Hochwalt, Serial No. 501,795, filed April 18, 1955. Homopolymers of butadiene, homopolymers of isoprene, and copolymers of butadiene with isoprene, as prepared by the use of Ziegler-type catalysts are also of great interest, having exceptionally low temperature properties, as disclosed in the copending application of Rober J. Slocombe, Serial No. 502, 189, filed April 18, 1955. Other ethylenically unsaturated hydrocarbons whose Ziegler polymers are of potential interest include butylenes, especially butene-1, amylenes and the like. Substituted olefins are also of interest, such as vinylcyclohexene, styrene, vinylnaphthalene, vinyl aromatic hydrocarbons generally, etc. Styrene when polymerized in the presence of Ziegler-type catalysts gives a high-molecular-weight polymer showing a crystalline structure by X-ray diffraction examination. Ziegler-type polyvinyl ethers, especially the homopolymers of alkyl vinyl ethers, e.g., ethyl vinyl ether, 2-ethylhexyl vinyl ether, etc., and copolymers of same with ethylene and other copolymerizable ethylenically unsaturated comonomers can also be prepared by the action of Ziegler catalysts, as disclosed in the copending application of Earl W. Gluesenkamp, Serial No. 507,717, filed May 11, 1955. A variety of copolymers of the various monomers named above with each other and with other comonomers can be prepared by Ziegler catalysis, and the present invention in its broadest scope includes all such and, in fact, all polymers prepared through the agency of Ziegler-type catalysts on any single monomer or mixture of monomers polymerizable with such catalysts.

Despite the broad scope of the invention, it will be found more convenient in most of the present application to discuss thet invention with specific reference to preferred embodiments thereof, and accordingly, Ziegler-type polyethylene will be especially referred to by way of example. Likewise, referred to especially by way of example will be catalysts prepared by the interaction of a trialkylaluminum with titanium tetrachloride, this being a preferred example of the preferred group of Ziegler catalysts which are those prepared by interaction of (a) an aluminum compound of the general formula $R_2AlX$ wherein R is an alkyl, cycloalkyl, or aryl radical and X is hydrogen, halogen, or an alkyl, cycloalkyl, or aryl radical, with (b) a metal halide selected from the group consisting of the chlorides, bromides and iodides of titanium and zirconium.

THE INVENTION IN FURTHER DETAIL

In accordance with one embodiment of the present invention, an active Ziegler catalyst is prepared, usually but not always as a dispersion in an inert organic liquid, and there is added to such catalyst a mercaptan in an amount effective to beneficiate, i.e., to beneficially modify the catalyst but insufficient to destroy its activity. An alternative procedure comprises adding the mercaptan compound to the polyvalent reducible metal compound Ziegler-catalyst-precursor, and interacting the thus-treated precursor with a reducing agent effective to produce an active Ziegler catalyst. (The invention cannot be practiced by adding the mercaptan compound to the reducing agent rather than to the polyvalent reducible metal compound or to the active catalyst.) A suitable amount of a mercaptan will vary somewhat dependent upon the particular mercaptan compound, catalyst, and reaction conditions and these amounts will be discussed in detail hereinafter, but in general the amount is in the neighborhood of 0.1 to 0.6 gram-mole of the mercaptan per gram-atom of the multivalent metal in the metal compound that is reduced in preparing the catalyst, e.g., $TiCl_4$. Depending upon the circumstances, the amount may be less than 0.1 gram-mole of the mercaptan per gram-atom of the said metal, or the gram-moles of the mercaptan may be one or two or so times the number of gram-atoms of said metal. Too little of a mercaptan is not very effective, but on the other hand, not very much can be used or the catalyst will be deactivated, i.e., its catalytic activity will be destroyed. It appears that any amount of a mercaptan decreases the catalytic activity somewhat, but in some instances, this is not undesirable and in other instances, in accordance with certain aspects of the invention, we readily overcome this effect partially or completely by alteration in reaction conditions, especially by imposing moderate pressure. It also appears that, in general, any amount of mercaptan causes a change in molecular weight of polymer obtained by use of the thus-treated Ziegler catalyst. Here again, in many instances this is not objectionable or is even desirable, while in other instances, in accordance with certain aspects of the invention, we overcome this effect partially or completely by changing the ratio of the reducing component of the catalyst to the multivalent metal component which is reduced.

MERCAPTAN MODIFIERS

The mercaptans are aliphatic sulfur compounds in which mercapto or sulfhydryl groups are attached to aliphatic residues by carbon-to-sulfur bonds. The mercaptans can be represented by the formula

RSH in which R represents an aliphatic radical. As the functional group in the mercaptan is mainly responsible for the modifier effect, the specific nature of the aliphatic radical is not too important. It will ordinarily be convenient to employ aliphatic hydrocarbon mercaptans, but the aliphatic radicals can have non-interfering substituents, or groups which have a desirable modifying effect; for example, the aliphatic radicals can have ether, olefin, keto, aldehyde, halogen, hydroxy, carboxyl, sulfide, or disulfide groups. The alkyl radicals ordinarily employed can be primary, secondary or tertiary alkyl groups of normal or forked structure, as found, for example, in such mercaptans as methyl mercaptan, ethyl mercaptan, n-propyl mercaptan, isopropyl mercaptan, n-butyl mercaptan, primary isobutyl mercaptan, secondary isobutyl mercaptan, tertiarybutyl mercaptan, amyl mercaptan, isoamyl mercaptan, hexyl mercaptan, octyl mercaptan, decyl mercaptan, dodecyl mercaptan, octadecyl mercaptan, etc.; the mercaptans employed will ordinarily contain no more than 20 carbon atoms, and will quite often have not more than 10 carbon atoms. The mercaptans employed can be derivatives of natural materials, for example, stearyl mercaptan. Lower alkyl mercaptans, such as all of the butyl mercaptans, can conveniently be employed. It is, of course, contemplated that the mercaptans may have a plurality of mercaptan or thiol groups, as well as a single such group; thus alkylene mercaptans can be employed, e.g., dithioethylene glycol; similarly, trithiols are applicable, e.g., trithioglycerol. Ordinarily it is preferred to employ mercaptans which do not have more than 2 or 3 thiol groups.

The mercaptan modifiers will ordinarily be employed as such; however, the present invention contemplates use of compounds which will generate mercaptans after incorporation in the Ziegler catalysts, or which will react with Ziegler catalyst to produce the same sulfur-containing catalysts as provided by incorporation of the mercaptans in Ziegler catalyst; or compounds which in combination with Ziegler catalyst in polymerization or other catalyzed procedures will produce the same sulfur-containing catalysts as provided in the use of mercaptan-treated Ziegler catalyst in such procedures. As examples of compounds capable of producing mercaptans, the following may be mentioned: readily reducible sulfur compounds, such as aliphatic sulfides and disulfides, e.g., dibutyl sulfide, dibutyl disulfide, and carbon disulfide; and mercaptan salts, i.e., mercaptides, such as alkali metal mercaptides, e.g., sodium ethyl sulfide, potassium butyl sulfide, etc. Of course, as indicated heretofore, it is much to be preferred that the Ziegler catalyst be treated with the mercaptan as such as this procedure is most effective.

The amount of a mercaptan to be employed is best related to the amount of catalyst and will vary considerably dependent upon the particular catalyst, its method of preparation, the particular mercaptan, and the extent to which catalyst modification is desired. However, the amount of a mercaptan to be used is always small, and an amount will be chosen effective to modify the catalyst but insufficient to decrease its activity to an undesirable extent and certainly insufficient to destroy the catalyst activity completely. In general, it can be stated that any substantial amount of a mercaptan which does not completely deactivate the catalyst will have some effect in narrowing the molecular weight distribution pattern of polymer prepared with the catalyst. A Ziegler catalyst can be considered deactivated for most purposes if it is incapable when suspended in a well-agitated inert solvent in concentration of about 20 mmoles/liter (based on the multivalent metal) of causing an ethylene uptake rate of at least 1 gram per hour per liter of reactor space at 20 atmospheres pressure; it is not usually practical to use a catalyst which does not have an uptake rate of at least 5–10 grams/hour/liter under such circumstances, and it is preferable that the uptake rate be 100 grams/hour/liter or higher. When the catalyst is employed under pressure and possibly at other concentrations, it should have an uptake rate of at least 25 grams/hour/liter under the conditions of employment, and preferably an uptake rate of 100 grams/hour/liter or higher. The ethylene uptake rates for any conditions can readily be ascertained. Even though a catalyst may be inactive according to the foregoing criteria, it should be realized that it can still have activity in some reactions, and therefore the present invention in its broader aspects contemplates any mercaptan-modified Ziegler catalyst. The Ziegler catalysts are made up of compounds of polyvalent metals which are reduced by reducing agents, the former being exemplified by $TiCl_4$ and the latter being exemplified by trialkylaluminums. For each mole of the said heavy metal compound which is reduced, when the said compound contains one atom of metal per molecule, the amount of a mercaptan to be used will generally be within the range of 0.1 to 2 moles. The optimum range, and even the operable range, in a given situation may be considerably smaller than this stated broad range. In some instances, the range of optimum or operable proportions will be outside these stated ranges. However, it is a matter of the simplest of tests to determine operable and optimum quantities of any given mercaptan with any given Ziegler catalyst. Such test can, for example, be carried out as described in the specific examples hereinafter, and having had the benefit of the present disclosure, they are well within the skill of the art. With Ziegler catalysts prepared by the interaction of a trialkylaluminum with titanium tetrachloride, there is almost always used an amount of mercaptan within the range of from 0.1 to 1.5 moles per mole of $TiCl_4$ used, i.e., per gram atom of titanium. It is often desirable to utilize mercaptan or approximately a half mole per mole basis with the aluminum alkyl, e.g., from about 0.3 to about 0.7 mole mercaptan for each gram-atom of aluminum.

When Ziegler catalyst prepared in accordance with the present invention is used as a polymerization catalyst, the molecular weight of the resulting polymer is often lower than the molecular weight would be if a mercaptan had not been used in preparing the catalyst and the polymerization carried out under otherwise identical conditions. In many instances, this is very desirable, as when monomer, catalyst and reaction conditions are chosen to give polymers having desirable properties but whose molecular weights are somewhat higher than desired for a given purpose. However, if it is desired to overcome the effect of the chosen mercaptan in lowering the molecular weight, this can be done by altering catalyst preparation conditions. The mole ratio of a trialkylaluminum to a titanium salt used in preparing the catalyst can be used to effect control of molecular weight, the higher ratios producing higher molecular weights. The $R_3Al/TiCl_4$ mole ratios employed are generally in the range of about 0.3:1 to 0.8:1, although a higher or lower ratio can be used, for example, 0.1:1 to 3:1 or so.

Use of a mercaptan tends to decrease the activity of the catalyst. As already pointed out, the amount of mercaptan must be limited so that this decrease in activity does not occur to an extent that is undesirable, all other things being considered, and certainly must be limited so that the catalyst activity is not destroyed. The activity of the catalyst can be noted by the rate at which ethylene is polymerized or other reaction is effected by the aid of the catalyst in a comparison of said rate with the rate where the mercaptan is not used and/or the said mole ratio is not increased. Decreased catalyst activity, which results in a decreased rate of reaction, can be compensated for by a change in several reaction variables such as by increasing the amount of catalyst, increasing the temperature, or increasing the pressure. We usually prefer to increase the pressure. We find that a very modest increase in pressure, say from atmospheric up to 50 or 100 or 200 pounds per square-inch gauge, is usually quite sufficient to obtain adequate reaction rate. In the case of catalysts which require pressure in the first instance for a satisfactory rate of polymerization when being used to polymerize ethylene or other monomer, the pressure can be still further increased to restore the reaction rate which has decreased because of the use of a mercaptan.

We ordinarily prefer to prepare an active Ziegler catalyst as a dispersion in an inert organic liquid, such as an aliphatic or aromatic hydrocarbon as will be discussed more in detail hereinafter. This dispersion is ordinarily a colloidal suspension of catalyst particles in the liquid. We then add the chosen mercaptan in the chosen amount, and preferably the mercaptan before addition is diluted somewhat with an inert organic liquid and the addition made with vigorous agitation so as to prevent localized concentration of mercaptan during the treatment of the catalyst therewith. It is necessary in accordance with the presently preferred practice of the invention to prepare an active Ziegler catalyst first, and then to treat same with the chosen mercaptan. To treat the reducing agent, such as the trialkylaluminum, first with mercaptan and then add the heavy metal compound, e.g., $TiCl_4$, tends to give rather inactive catalyst and, furthermore, use of such a catalyst does not result in the improvements in the polymer which are desired. It is permissible to add the mercaptan first to the multivalent metal compound, e.g., $TiCl_4$, prior to its interaction with the reducing agent, e.g., trialkylaluminum. Ordinarily the monomer is polymerized in the presence of the catalyst dispersion which has been treated with a mercaptan. However, prior to the polymerization or other use of the catalyst, part or all of the solvent may be removed as by filtration, evaporation, and the like, care being taken not to use conditions for such a separation that will deactivate the catalyst. It is also possible if a dry catalyst or catalyst in a reduced amount of organic liquid, is to be used, to prepare the active catalyst in such form prior to its treatment with a mercaptan. In such event, particular care must be taken to insure thorough admixture of the chosen amount of mercaptan with the total catalyst, and this can involve using a limited amount of inert organic liquid as a solvent and/or suspending agent for the chosen mercaptan, or thorough grinding as by ball milling the catalyst, either in a dry condition or with some inert organic liquid present, with the chosen mercaptan.

Ordinarily, it is quite sufficient and, in fact, desirable to use only a single mercaptan compound. However, it is not outside the scope of the invention to utilize an admixture of two or more such compounds, or an admixture of any one or more such compounds with any other catalyst modifying agent that may be desired, e.g., with the thiophenols described in copending application, S.N. 609,798.

DETAILS OF PREPARATION AND USE OF ZIEGLER CATALYSTS

More detailed information will now be given on preferred procedures and components for preparing various Ziegler catalysts, and it will be understood that the procedures given herein with respect to use of a mercaptan will be followed. Ziegler catalysts, for whatever use desired, can be prepared in the vessel in which the catalyzed reaction is to be carried out, or can be prepared in one vessel and then transferred to the intended reaction vessel, and in either event, can either be used immediately after preparation or after a period of time elapses between the preparation of the catalyst and its subsequent use to catalyze, e.g., polymerization. If the catalyst is to be used after such a period of time, it is apt to lose activity during storage period and/or produce polymer of an increased molecular weight as compared with that produced with fresh catalyst and these disadvantages can be minimized by storing Ziegler catalyst at temperatures below about 10° C. and preferably below $-25°$ C. for fairly long storage periods, as disclosed and claimed in the copending application of Robert J. McManimie, Harry G. Hurst, and Edward H. Mottus, S.N. 586,352, filed May 22, 1956. While Ziegler catalysts are often conveniently prepared at room temperature, they can be prepared at higher temperatures, and also certain advantages are obtained, including uniform catalyst activity over the course of a reaction period and more effective removal of catalyst residues if the catalyst is prepared at temperatures below about $-25°$ C. as disclosed and claimed in the copending application of Robert J. McManimie, Harry G. Hurst, and Edward H. Mottus, S.N. 586,353, filed May 22, 1956.

We prefer catalysts prepared by the interaction of (a) an aluminum compound of the general formula $R_2AlX$ wherein R is an alkyl, cycloalkyl or aryl radical and X is hydrogen, halogen or an alkyl, cycloalkyl or aryl radical, with (b) a metal halide selected from the group consisting of the chlorides, bromides and iodides of titanium and zirconium. The preparation of polymers will be described, by way of example, with particular reference to catalysts prepared by the interaction of trialkylaluminums, e.g., triethylaluminum, triisobutylaluminum, trioctylaluminum, with titanium tetrachloride.

Suitable alluminum compounds to be reacted with the chlorides, bromides and iodides of titanium or zirconium are those represented by the general formula $R_2AlX$ wherein R is an alkyl, cycloalkyl or aryl radical and X is hydrogen, halogen, or an alkyl, cycloalkyl or aryl radical. By way of example, but not limitation, the following compounds are mentioned:

Triethylaluminum
Triisobutylaluminum
Trioctylaluminum
Didodecyloctylaluminum
Diisobutylaluminum hydride
Tridodecylaluminum
Diphenylaluminum bromide
Dipropylcyclohexylaluminum
Ditolylmethylaluminum
Tri-($\beta$-phenylethyl)aluminum
Diethylaluminum chloride
Diisobutylaluminum chloride
Diisobutylaluminum iodide
Di($\beta$-cyclohexylpropyl)isobutylaluminum It is to be understood that mixtures of the foregoing types of aluminum compounds can be employed. One can use the total reaction mixtures obtained in the formation of such compounds, e.g., by treatment of metallic aluminum with alkyl halides resulting in the formation of such mixtures as $R_2AlCl$ plus $RalCl_2$, termed alkylaluminum sesquihalides.

The aluminum compounds in question are interacted with one or more chlorides, bromides or iodides of titanium or of zirconium, the chlorides and iodides being preferred. The titanium or zirconium in these halides should be in a valence form higher than the lowest possible valence. The tetrahalides are especially preferred, although the dihalides, trihalides, mixtures of di-, tri- and tetrahalides, etc., can be used. Preferred titanium or zirconium compounds are those that are soluble in an organic solvent (preferably a hydrocarbon such as hexane, benzene, kerosene, etc.) that is used in preparing the catalyst. Titanium or zirconium compounds other than the named halides, e.g., those called alcoholates, alkoxides or esters by various investigators such as titanium tetramethoxide (also called tetramethyl titanate), titanium triethoxide, tripropoxytitanium chloride, zirconium tetra-n-butoxide, or fluorides of titanium or zirconium, or complexes such as zirconium acetylacetonate, $K_2TiF_6$, or salts of organic acids such as the acetates, benzoates, etc., of titanium and zirconium, can be used to prepare catalysts with at least some activity and to that extent can be considered equivalents of the halides; however, such compounds are usually prepared from the halides and hence are more costly, and also are usually less active, so their use is economically sound only where in a particular situation favorable effects can be obtained such as increased solubility in an organic solvent that is used in preparing the catalyst, or polymer of increased molecular weight, or faster reaction rate. Although the exact action resulting from contacting the aluminum compound with the titanium or zirconium compound is not understood, it is believed likely that the zirconium or titanium halide is reduced in valence by the reaction of the added aluminum compound. The mole ratio of aluminum compound to titanium (or zirconium) compound, or stated another and simpler way, the mole ratio of aluminum to titanium (or zirconium) can vary over a wide range, suitable values being from 0.1:1 to 10:1 on up to 15:1 or higher. It is generally preferred to use an Al:Ti mole ratio between 0.3:1 and 5:1. The same ratios apply in the case of the zirconium compounds.

While active catalysts can be prepared by a variety of procedures, the simplest and perhaps most effective is to add the titanium or zirconium halide to the aluminum compound, or vice versa, preferably in the presence of an inert organic solvent. Such solvents can suitably be saturated aliphatic and alicyclic, and aromatic, hydrocarbons, halogenated hydrocarbons, and saturated ethers. The hydrocarbon solvents are generally preferred. By way of example can be mentioned liquefied ethane, propane, isobutane, normal butane, n-hexane, the various isomeric hexanes, isooctane, cyclohexane, methylcyclopentane, dimethylcyclohexane, dodecane, industrial solvents composed of saturated and/or aromatic hydrocarbons, such as kerosenes, naphthas, etc., especially when hydrogenated to remove any olefin compounds and other impurities, and especially those ranging in boiling point up to 600° F. Also, benzene, toluene, ethylbenzene, cumene, decalin, ethylene dichloride, chlorobenzene, diethyl ether, o-dichlorobenzene, dibutyl ether, tetrahydrofuran, dioxane. In some instances, it is also advantageous to prepare the catalyst in the presence of a monomer; for example, if the catalyst is prepared in the presence of liquid ethylene, and then used to polymerize ethylene, a high yield of polyethylene results.

It may also be mentioned here that the polymerization can readily be effected in the presence of any of the classes of solvents and specific solvents just named. If the proportion of such solvent is kept low in the reaction mixture, such as from 0 to 0.5 part by weight inert organic solvent (i.e., inert to the reactants and catalysts under the conditions employed) per 1 part by weight total polymer produced, solvent recovery steps are obviated or minimized with consequent advantage. It is often helpful in obtaining efficient contact between monomers and catalyst and in aiding removal of heat of reaction, to employ larger amounts of solvent, for example, from 5 to 30 parts by weight solvent per 1 part by weight total polymer produced. These inert solvents, which are solvents for the monomers, some of the catalyst components, and some of the polymers, but are nonsolvents for many of the polymers, e.g., polyethylene, can also properly be termed inert liquid diluents, or inert organic liquids.

The amount of catalyst required is dependent on the other variables of the particular reaction, such as polymerization, and although amounts as small as 0.01 weight percent based on total weight of monomers charged are sometimes permissible, it is usually desirable to use somewhat larger amounts, such as from 0.1 up to 2 to 5 percent or even considerably higher, say up to 20 percent, depending upon the monomer or monomers, the presence or absence of solvent, the temperatures, pressures, and other reaction conditions. When polymerization is effected in the presence of a solvent, the catalyst to solvent weight ratio should be at least about 0.001:1 and much lower values such as 0.0001:1 can sometimes be used.

When the polyvalent metal in the catalyst is titanium, the concentration of catalyst will ordinarily be from about 10 to 30 or 40 millimoles per liter of polymerization medium (calculated on the basis of titanium), although other ranges can be employed, e.g., from amounts less than about 5 to about 60 millimoles per liter or even stronger concentrations.

The polymerization can be effected over a wide range of temperatures, again the particular preferred temperature being chosen in accordance with the monomer, pressure, particular catalyst and other reaction variables. For many monomers from room temperature down to say minus 40° C. and even lower are suitable, and in many cases it is preferred that the temperature be maintained at below about 35° C. However, for other monomers, particularly ethylene, higher temperatures appear to be optimum, say from 50 to 75° C. for ethylene. Temperatures ranging up to 150° C. and higher are generally satisfactory for Ziegler type polymerization.

The pressure at which the polymerization is carried out is dependent upon the chosen monomer or monomers, as well as other variables. In most instances, the polymerization is suitably carried out at atmospheric pressure or higher. Sub-atmospheric pressures are permissible. Pressures ranging from atmospheric up to several hundred or even many thousand pounds per square inch, e.g., 50,000 p.s.i. and higher, are suitable. While high pressures are not required in order to obtain the reaction, they will have a desirable effect on reaction rate and, in some instances, on polymer quality. The choice of whether or not to use an appreciably elevated pressure will be one of economic and practical considerations taking into account the advantages that can be obtained thereby.

The catalyst is sensitive to various poisons, among which may be mentioned oxygen, water, carbon dioxide, carbon monoxide, acetylenic compounds such as acetylene, vinylacetylene, alcohols, esters. ketones, aldehydes, and the like. For this reason, suitable precautions should be taken to protect the catalyst and the reaction mixture from excessive contact with such materials. An excess of the aluminum compound tends to give a certain amount of protection against these poisons. The monomers and diluents or solvents, if used, need not be pure so long as they are reasonably free from poisons. However, best results are ordinarily obtained if the monomer feed contains at least 90 weight percent and preferably higher of the polymerizable monomer, exclusive of any solvent material. It is desirable to protect the catalyst during preparation, storage, and use by blanketing with an inert gas, e.g., nitrogen, argon, or helium.

The monomer or mixture of monomers is contacted with the catalyst in any convenient manner, preferably by bringing the catalyst and monomer together with intimate agitation provided by suitable stirring or other means. The agitation can be continued during the polymerization, or in some instances, the polymerization mixture can be allowed to remain quiescent while the polymerization takes place. In the case of the more rapid reactions with the more active catalyst, means can be provided for refluxing monomer and solvent if any of the latter is present, and thus remove the heat of reaction. In any event, adequate means should be provided for dissipating the exothermic heat of polymerization. If desired, the monomer can be brought in vapor phase into contact with the solid catalyst, in the presence or absence of liquid solvent. The polymerization can be effected in the batch manner, or in a continuous manner, such as for example, by passing the reaction mixture through an elongated reaction tube which is contacted externally with suitable cooling medium to maintain desired reaction temperature; or by passing the reaction medium through an equilibrium-overflow reactor, or a series of the same.

The polymer will be recovered from the total reaction mixture by a wide variety of procedures, chosen in accordance with the properties of the particular polymer, the presence or absence of solvent, and the like. It is generally quite desirable to remove as much catalyst from the polymer as possible, and this is conveniently done by contacting the total reaction mixture or the polymer after separation from solvent, etc., with methanolic hydrochloric acid, with an aliphatic alcohol such as methanol, isobutanol, secondary butanol, or by various other procedures. If the polymer is insoluble in the solvent, it can be separated therefrom by filtration, centrifuging or other suitable physical separation procedure. If the polymer is soluble in the solvent, it is advantageously precipitated by admixture of the solution with a nonsolvent, such nonsolvent usually being an organic liquid miscible with the solvent but in which the polymer to be recovered is not readily soluble. Of course, any solvent present can also be separated from polymer by evaporation of the solvent, care being taken to avoid subjecting the polymer to too high a temperature in such operation. If a high boiling solvent is used, it is usually desirable to finish any washing of the polymer with a low boiling material, such as one of the lower aliphatic alcohols or hexane, pentane, etc., which aids removal of the higher boiling materials and permits the maximum removal of extraneous material during the final polymer drying step. Such drying step is desirably effected in a vacuum at moderate temperatures, preferably well below 100° C.

The foregoing principles and procedures can be applied, with suitable modifications when necessary, to reactions other than polymerizations, effected in the presence of Ziegler catalysts modified with a mercaptan in accordance with the present invention.

In order to illustrate some of the various aspects and advantages of the invention, the following examples are given. Ethylene has been chosen as a representative monomer, triisobutylaluminum has been chosen as a representative reducing agent in preparing the catalyst, titanium tetrachloride has been chosen as a representative polyvalent metal compound that is reduced in preparing the catalyst and kerosene has been chosen as a representative inert organic liquid for preparation of the catalyst dispersion and in which to carry out the polymerization. It will, or course, be understood that variations from the particular catalyst components, monomers, mercaptans, solvents, proportions, temperatures and the like can be made without departing from the invention.

*Example 1*

Twenty mmoles $TiCl_4$ was dissolved in 700 ml. Deo-Base kerosene in a 2 liter Morton flask, and 10 mmoles Al (isobutyl)$_3$ in 200 ml. Deo-Base kerosene was added with stirring in a 2- to 3-minute period. The mixture was gradually warmed to 70° C., over a 15-minute period. Tertiarybutyl mercaptan, 5 mmoles in about 115 ml. Deo-Base kerosene was added at the 12-minute mark. Ethylene was admited at the rate of about 132 grams/hour/liter and permitted to polymerize at atmospheric pressure. The reaction was quenched by treatment with 100 ml. isobutyl alcohol for 15 minutes at 60 to 70° C. The polyethylene was separated by filtration at 70° C. and was washed on the filter with about 150 ml. isobutyl alcohol. The polyethylene was then slurried in 1 liter isobutyl alcohol, refluxed 15 minutes, separated from the hot mixture by filtration and air-dried, to give 97 grams polyethylene. The polyethylene having a density of 0.9417 had a tensile strength of 3197 p.s.i. at yield, and 2762 p.s.i. at break. The percent of elongation at yield was 12, and at break was 724. The flow-impact relationship showed marked improvement over that for ordinary Ziegler low-pressure polyethylene. The melt index was 0.09 decigram/minute, and the Izod impact strength was 184 ft.-lbs./inch of notch. The melt index/impact relationship is about 20% better than that of ordinary low-pressure polyethylene, as can be seen by reference to the figure.

The impact strength was determined by the Izod impact test which measures the energy necessary to break a notched specimen of the polymer when struck by a pendulum (ft.-lbs./inch of notch). The flow properties were determined (ASTM D–1238–52T) by forcing a molten polymer at a temperature of 190° C. through a small orifice and reported as the melt index, i.e., the extrusion rate in grams polymer per 10 minutes (decigrams/minute).

*Example 2*

Polyethylene was polymerized according to the procedure of Example 1, but utilizing 6 mmoles of n-butyl mercaptan as modifier in place of the tertiary butyl mercaptan. The 92 grams of ethylene provided at a feed rate of 135 grams/hour/liter gave 82 grams of polyethylene having a density of 0.9435. The polyethylene had tensile strength of 3409 p.s.i. at yield, and 2511 p.s.i. at break. The percent elongation at yield was 10, and at break was 613. The specific viscosity measured on 0.1% solution in toluene at 100° C. was 0.264. The melt index was 0.07 decigram/minute, and the impact strength was 2.6 ft.-lbs./inch of notch. The melt index/impact relationship is about 30% better than that of ordinary low-pressure polyethylene, as can be seen by reference to the figure.

COMPARATIVE EXAMPLE

Ethylene was polymerized in the presence of Ziegler catalyst according to the procedure of Example 1 except that no modifier was employed. The resulting polyethylene of density 0.9432 had a tensile strength of 3302 p.s.i. at yield and 1885 p.s.i. at break; however, the impact/flow relationship was clearly inferior to that of the examples utilizing modified catalyst; the melt index was 0.22 decigram/minute and the Izod impact strength was 0.974 ft.-lbs. per inch of notch.

It has recently been discovered that the molecular weight distribution has a marked effect on properties of Ziegler polymes. If a normal Ziegler polyethylene is fractionated into various fractions according to molecular weight, i.e., low, medium, high, etc., it is found that some of the intermediate fractions having narrow molecular weight distributions possess good impact/flow properties. Such polymers have a median molecular weight, $M_n$, which approaches their average molecular weight, $M_w$, i.e., there are not a sufficient number of extremely high molecular weight species present to make the weight average molecular weight $M_w$ (which gives weighted value to higher molecular weights) many times higher than the number average molecular weight, $M_n$ (which is not unduly influenced by higher molecular weights). It follows from the above that it is desirable to have a low $M_w/M_n$ ratio. Extensive fractionation of the polymers according to molecular weight would not ordinarily be feasible. However, modification of the catalyst with mercaptans appears to be effective in lowering the $M_w/M_n$ ratio of polymers in the presence of the so-modified catalyst.

In addition to the procedures taught herein, mercaptans can be used according to any of the procedures taught in our copending application S.N. 695,009, filed November 7, 1957.

While the invention has been described with particular reference to preferred embodiments thereof, it will be appreciated that variations from the details given herein can be effected without departing from the invention in its broadest aspects.

What is claimed is:

1. A method for preparing a polymerization catalyst by the interaction of (a) an aluminum compound of the general formula $R_2AlX$ wherein R is selected from the group consisting of alkyl, cycloalkyl and aryl radicals and X is selected from the group consisting of hydrogen, halogen, alkyl, cycloalkyl and aryl radicals, with (b) a metal halide selected from the group consisting of the chlorides, bromides, and iodides of titanium and zirconium, in which an alkyl mercaptan of up to 20 carbon atoms is added subsequent to the said metal halide in an amount which is substantial but insufficient to destroy activity of the catalyst, the said alkyl mercaptan being used in an amount from 0.1 to 1.5 moles per mole of metal halide used.

2. A method for preparing a polymerization catalyst by the interaction of (a) an aluminum compound of the general formula $R_2AlX$ wherein R is selected from the group consisting of alkyl, cycloalkyl and aryl radicals and X is selected from the group consisting of hydrogen, halogen, alkyl, cycloalkyl and aryl radicals, with (b) a metal halide selected from the group consisting of the chlorides, bromides, and iodides of titanium and zirconium, in which an alkyl mercaptan of no more than 10 carbon atoms is added following admixture of (a) and (b), in an amount from 0.1 to 1.5 moles per mole of metal halide used.

3. The method of claim 2 in which the mercaptan is tertiarybutyl mercaptan.

4. The method of claim 2 in which the mercaptan is n-butyl mercaptan.

5. A method which comprises reacting a trialkylaluminum with titanium tetrachloride in a mole ratio of from 0.3:1 to 0.8:1 in an inert hydrocarbon to form an active catalyst dispersion and then adding thereto an alkyl mercaptan of no more than 10 carbon atoms in an amount of from 0.1 to 1.5 moles per mole of titanium tetrachloride used.

References Cited in the file of this patent

UNITED STATES PATENTS

| | | |
|---|---|---|
| 2,822,357 | Brebner et al. | Feb. 4, 1958 |
| 2,827,446 | Breslow | Mar. 18, 1958 |
| 2,843,577 | Friedlander | July 15, 1958 |

FOREIGN PATENTS

| | | |
|---|---|---|
| 534,792 | Belgium | Jan. 31, 1955 |
| 785,314 | Great Britain | Oct. 27, 1957 |